United States Patent
Pratt et al.

(10) Patent No.: US 6,917,490 B2
(45) Date of Patent: Jul. 12, 2005

(54) SYSTEM AND METHOD FOR STORING INFORMATION IN A DISK DRIVE

(75) Inventors: Thomas L. Pratt, Austin, TX (US); Raymond Farrell Dumbeck, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 10/260,674

(22) Filed: Sep. 30, 2002

(65) Prior Publication Data

US 2004/0061970 A1 Apr. 1, 2004

(51) Int. Cl.$^7$ ............................................. G11B 5/596
(52) U.S. Cl. .................... 360/78.08; 360/75; 360/78.01
(58) Field of Search ............................. 360/15, 47–48, 360/31, 63, 53, 78.08, 75, 76, 77.01, 77.02, 77.06, 78.01, 78.04; 711/114, 4; 369/84, 53.1

(56) References Cited

U.S. PATENT DOCUMENTS

| | | | | |
|---|---|---|---|---|
| 3,729,725 A | * | 4/1973 | Denney et al. | 360/47 |
| 5,463,758 A | * | 10/1995 | Ottesen | 711/114 |
| 6,493,160 B1 | * | 12/2002 | Schreck | 360/15 |

* cited by examiner

*Primary Examiner*—David Hudspeth
*Assistant Examiner*—Jason Olson
(74) *Attorney, Agent, or Firm*—Haynes and Boone, LLP

(57) ABSTRACT

An information handling system includes a processor and a disk drive coupled to receive information from the processor. The disk drive is configured to write the information to a first location on a platter. The disk drive is further configured to write the information to n locations on the platter such that a phase difference between successive locations is approximately (360 divided by n) degrees where n is an integer greater than or equal to two.

21 Claims, 7 Drawing Sheets

SYSTEM AND METHOD FOR STORING INFORMATION IN A DISK DRIVE

BACKGROUND

The disclosures herein relate generally to information handling systems and more particularly to a system and method for storing information in a disk drive.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system typically includes one or more hard disk drives for storing information. The performance of a hard disk drive generally has a direct impact on the performance of an information handling system. Unfortunately, increasing the performance of a hard disk drive often involves increased costs.

Customers in various segments desire higher performance (in terms of lower latency) and/or increased reliability of their data but are unwilling to pay a significant premium for a hardware solution.

In addition, data reliability is needed in an information handling system. Data reliability can be achieved by storing copies of information onto multiple storage media such as multiple hard disk drives. The use of multiple storage media, however, generally increases the cost of the information handling system.

The lower latency aspects of higher performance are generally addressed by employing higher rotation rate disk drives. This results in increased power consumption, heat dissipation, and higher noise levels, and does not address reliability concerns.

Increasing the reliability of data is often addressed by means of a hardware or OS RAID 1 drive implementation or other mirroring technique. This requires multiple drives, and does not address needs for lower latency and reduced cost.

It would be desirable to be able to increase disk drive performance and/or data reliability without increasing the cost of an information handling system. Accordingly, what is needed is a system and method for storing information in a disk drive.

SUMMARY

One embodiment, accordingly, provides an information handling system that includes a processor and a disk drive coupled to receive information from the processor. The disk drive is configured to write the information to a first location on a platter. The disk drive is further configured to write the information to n locations on the platter such that a phase difference between successive locations is approximately (360 divided by n) degrees.

A principal advantage of this embodiment is that various shortcomings of previous techniques are overcome. For example, disk drive performance and/or data reliability may be increased without increasing the cost of an information handling system.

DETAILED DESCRIPTION

For purposes of these embodiments, an information handling system may include any instrumentality or aggregate of instrumentalities primarily designed to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
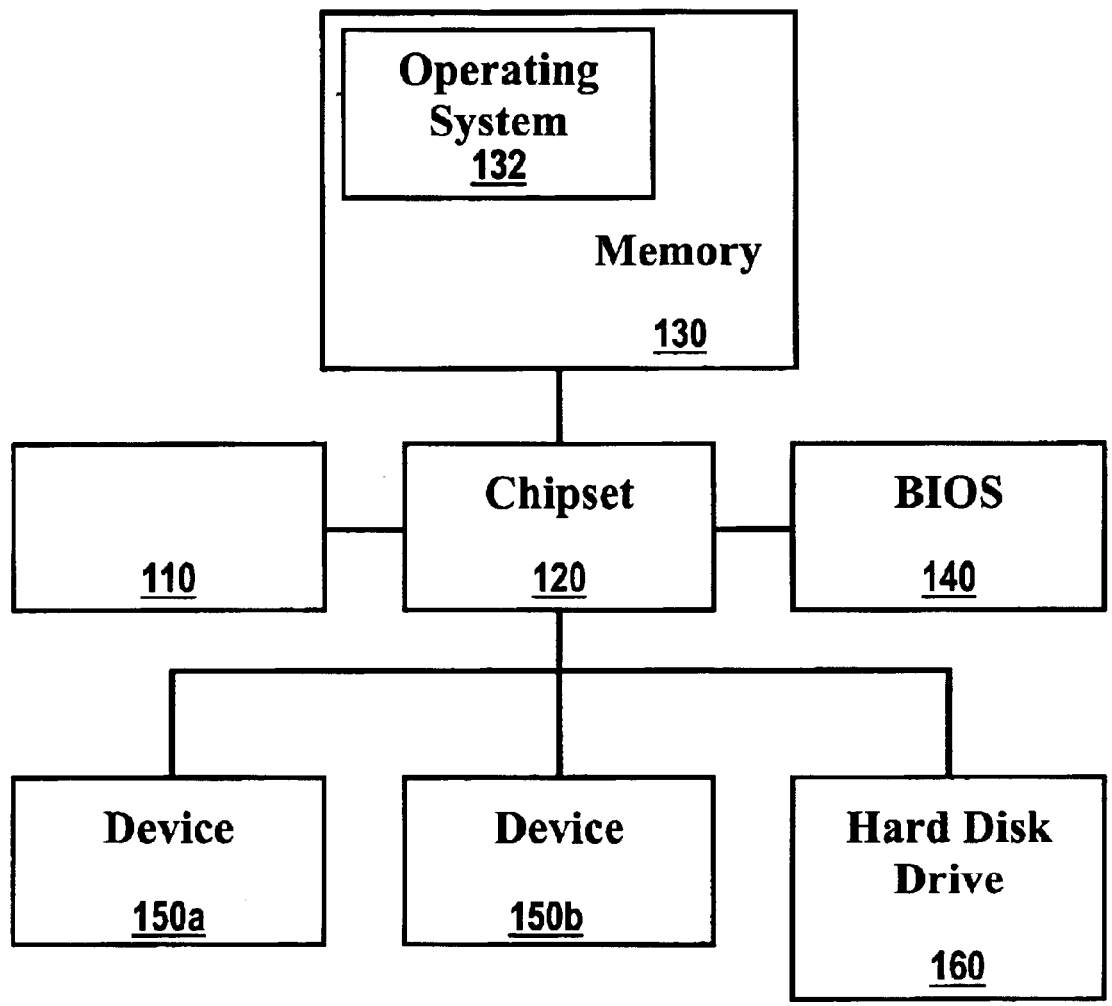
FIG. 1 is a diagram illustrating an embodiment of selected portions of an information handling system.

FIG. 1 is a diagram illustrating an embodiment of selected portions of an information handling system 100. Information handling system 100 is an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes. System 100 includes a processor 110, a chipset 120, a memory 130, a basic input output system (BIOS) 140, devices 150a and 150*b*, and a hard disk drive 160. Chipset 120 is coupled to processor 110, memory 130, BIOS 140, and devices 150*a* and 150*b*. Memory 130 includes an operating system 132 and may include multiple types of storage media such as RAM, DRAM, SDRAM, and other storage devices. Devices 150*a* and 150*b* are each connected to chipset 120 using a bus such as a PCI or Universal Serial bus, a direct connection to a device controller within chipset 120, or other suitable connection means.

System 100 operates by executing BIOS 140 or a system firmware (not shown) in response to being powered up or reset. BIOS 140 identifies and initializes the components of system 100 and causes operating system 132 to be booted. Operating system 132 provides a user of system 100 with an ability to initiate and run one or more applications (not shown) on system 100. The applications may be stored on a storage media of system 100 or on a remote device configured to communicate with system 100. System 100 may be configured to communicate with other devices or information handling systems using wired or wireless communications devices.

Hard disk drive 160 is configured to store information such as operating system 132, applications (not shown), and other software and data. Hard disk drive 160 receives information from information handling system 100 and stores that information in response to receiving and processing a write command. In addition, hard disk drive 160 provides information to information handling system 100 in response to receiving and processing a read command.

Hard disk drive 160 is configured to provide additional information reliability by storing multiple copies of information in response to write commands as described herein. In particular, hard disk drive 160 writes information to a number of locations (n locations) that have a phase difference of (360 divided by n) degrees between a beginning of successive locations, where n is an integer greater than or equal to two.

As used herein, the term phase difference refers to the angle defined by a first line drawn from the center of a platter of the hard disk drive, to a beginning of any of the locations where the information is stored, and a second line drawn from the center of the platter to a beginning of the next location where the information is stored, as will be evident from the description of FIGS. 4, 7, and 8 below. Where the n locations are located on different platters, the first line is drawn from the center of the first platter to the beginning of any location, the second line is drawn from the center of the second platter to the beginning of the next location, and the angle is measured relative to an imaginary plane that is parallel to the platters.

According to the above formula, for example, the phase difference is 180 degrees when n is equal to 2, 120 degrees when n is equal to 3, 90 degrees when n is equal to 4, and so on. In addition, where n is greater than two, the total number of stored copies of the information may be equal to n. For example, when n is equal to three, three copies of the information may be stored at three different locations that begin (360 divided by n) degrees, i.e. 120 degrees, apart. Similarly, when n is equal to four, four copies of the information may be stored at four different locations that begin 90 degrees apart.

As shown by the embodiments in FIGS. 2–8, the n locations where the information is stored may be on the same or different sides of a platter and/or same or different tracks of a platter. The n locations could also exist on multiple platters.

Figure 2:
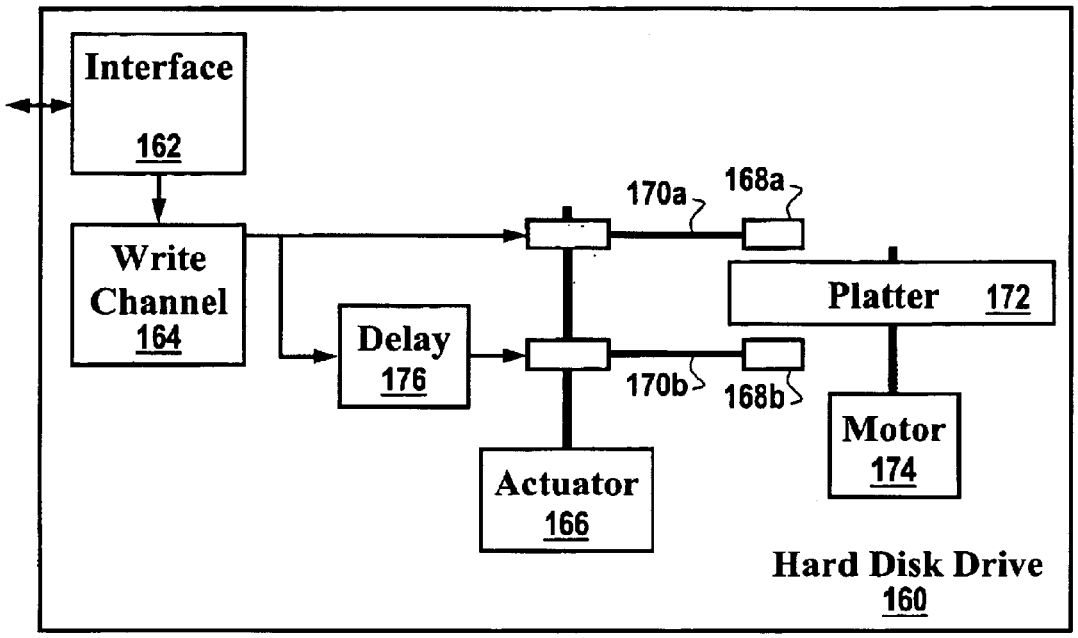
FIG. 2 is a diagram illustrating an embodiment of selected portions of a hard disk drive.
Figure 3:
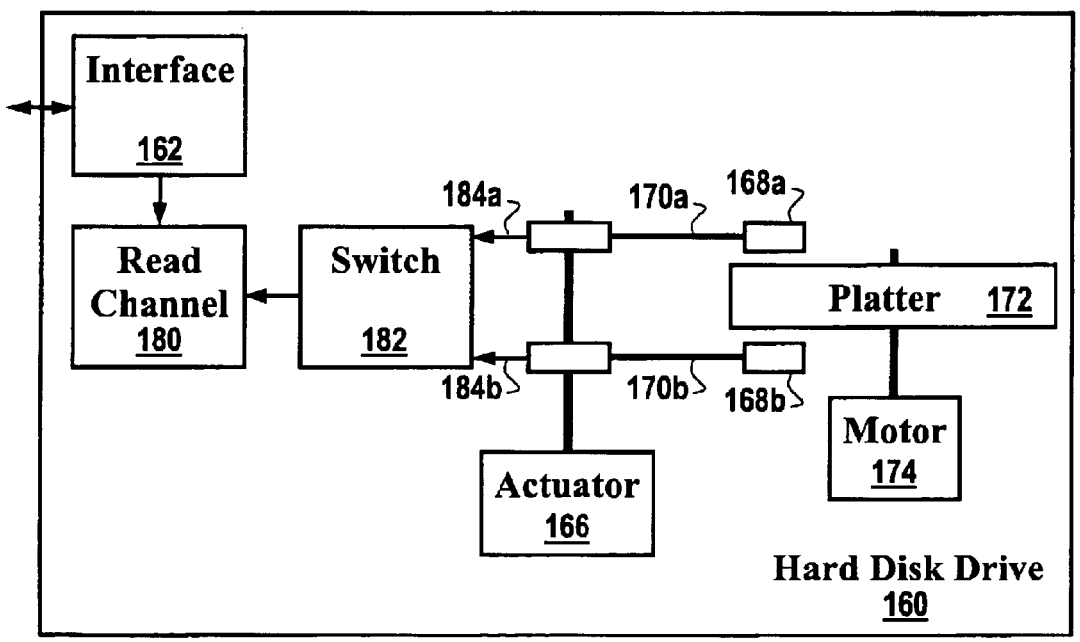
FIG. 3 is a diagram illustrating an embodiment of selected portions of a hard disk drive.
Figure 4:
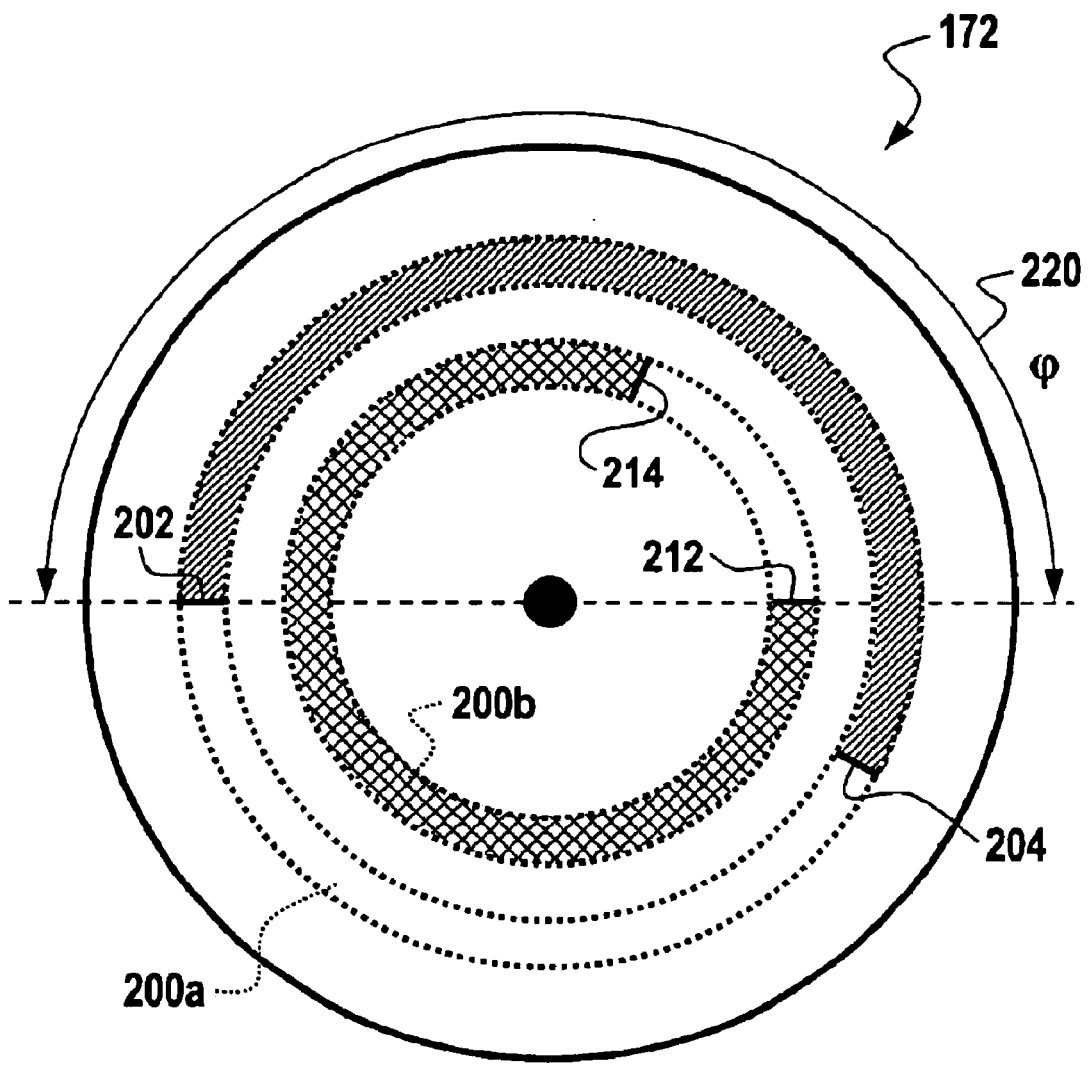
FIG. 4 is a diagram illustrating an example of storing information on a platter of a hard disk drive.

FIGS. 2–4 illustrate selected portions of an embodiment where n is equal to two and the first and second locations are on different sides of a platter or platters 172 of hard disk drive 160. As shown in the embodiment of FIG. 2, hard disk drive 160 includes an interface 162, a write channel 164, an actuator 166 for moving heads 168*a* and 168*b* using arms 170*a* and 170*b*, respectively, platter 172 driven by a motor 174, and a delay circuit 176. Interface 162, write channel 164, and delay circuit 176 comprise a portion of the control logic of hard disk drive 160 and may be implemented using hardware, software, or a combination of hardware and software.

In response to a request to write information from information handling system 100, hard disk drive 160 receives the information using the interface 162 and provides the information to write channel 164. Write channel 164 causes the information to be written to a first location on one side of platter 172 using head 168*a*. In addition, write channel 164 causes the information to be written to a second location on the other side of platter 172 using head 168*b* and delay circuit 176. Delay circuit 176 buffers the information to allow actuator 166 and motor 172 to align head 168*b* with the beginning of the second location on platter 172 so that the information can be written at the second location. Hard disk drive 160 may perform other operations prior to writing the information at the second location.

The above operation may be seen by way of an example shown in FIG. 4. FIG. 4 is a top side view of platter 172. Platter 172 includes a track 200*a* on its top side and a track 200*b* on its bottom side. In this example, the first location comprises a shaded portion of track 200*a*, and the second location comprises a crisscrossed portion of track 200*b*. The information is stored in the first location beginning at a sector 202 and ending at a sector 204 in track 200*a* on the top side of platter 172. The information is also stored in the second location beginning at a sector 212 and ending at a sector 214 in track 200*b* on the bottom side of platter 172. The phase difference $\Phi$ between sector 202 and sector 212, as indicated by an arrow 220, is 180 degrees because n equals two in this example.

Although the first and second locations are each located on a single track on different sides of platter 172 in the example of FIG. 4, the first and second locations may each comprise multiple tracks or portions of multiple tracks in other embodiments.

As shown in the embodiment of FIG. 3, hard disk drive 160 further includes a read channel 180 and a switch 182. Read channel 180 and switch 182 each comprise a portion of the control logic of hard disk drive 160 and may be implemented using hardware, software, or a combination of hardware and software.

In response to a request from information handling system 100 to read the information, hard disk drive 160 accesses the information from either the first location or the second location on platter 172 using either head 168*a* or head 168*b*. In particular, hard disk drive 160 reads the information from the first location in response to a first amount of time required to access the information from the first location being less than a second amount of time required to access the information from the second location. Similarly, hard disk drive 160 is configured to read the information from the second location in response to the first amount of time being greater than the second amount of time. To make this time determination, hard disk drive 160 may determine whether head 168*a* is closer to the beginning of the first location than head 168*b* is to the beginning of the second location according to the movement of actuator 166 and motor 174.

In response to reading the information from the first location, switch 182 causes the information to be provided from the first location to read channel 180 as indicated by an arrow 184*a*. In response to reading the information from the second location, switch 182 causes the information to be provided from the second location to read channel 180 as indicated by an arrow 184b. Read channel 180 receives the information and provides the information to interface 162 which provides the information to information handling system 100.

Figure 5:
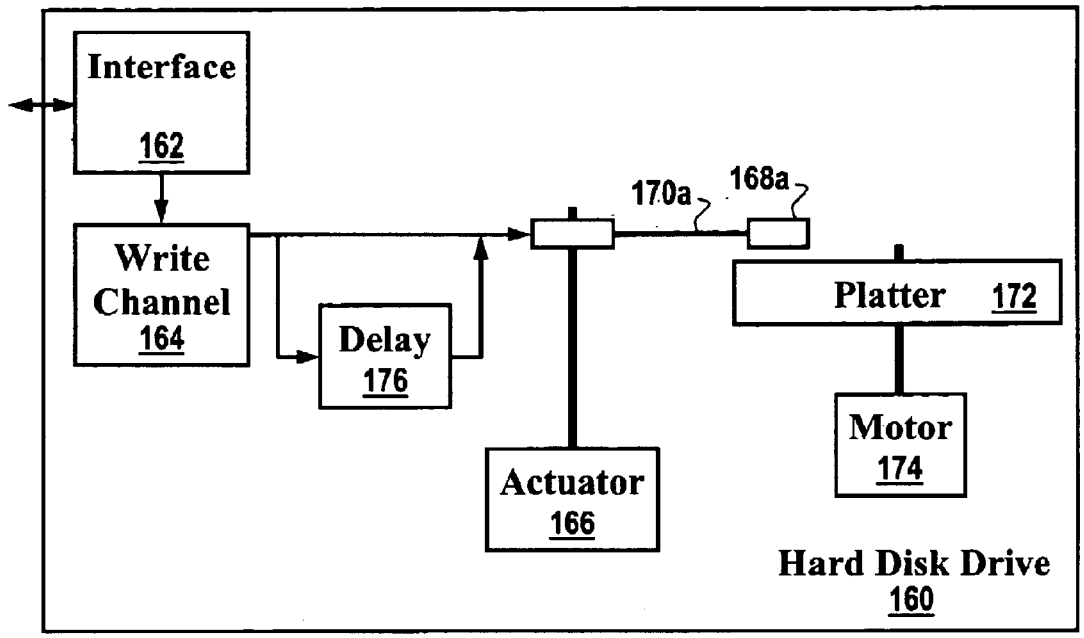
FIG. 5 is a diagram illustrating an embodiment of selected portions of a hard disk drive.

FIGS. 5–8 illustrate selected portions of an embodiment where n is equal to two and the first and second locations are on the same side of platter 172 of hard disk drive 160. As shown in the embodiment of FIG. 5, hard disk drive 160 includes interface 162, write channel 164, actuator 166 for moving head 168a using arm 170a, platter 172 driven by a motor 174, and a delay circuit 176. Interface 162, write channel 164, and delay circuit 176 comprise a portion of the control logic of hard disk drive 160 and may be implemented using hardware, software, or a combination of hardware and software.

In response to a request to write information from information handling system 100, hard disk drive 160 receives the information using the interface 162 and provides the information to write channel 164. Write channel 164 causes the information to be written to a first location on one side of platter 172 using head 168a. In addition, write channel 164 causes the information to be written to a second location on the same side of platter 172 using head 168a and delay circuit 176. Delay circuit 176 buffers the information to allow actuator 166 and motor 172 to align head 168a with the beginning of the second location on platter 172 so that the information can be written at the second location. Hard disk drive 160 may perform other operations prior to writing the information to the second location.

Figure 7:
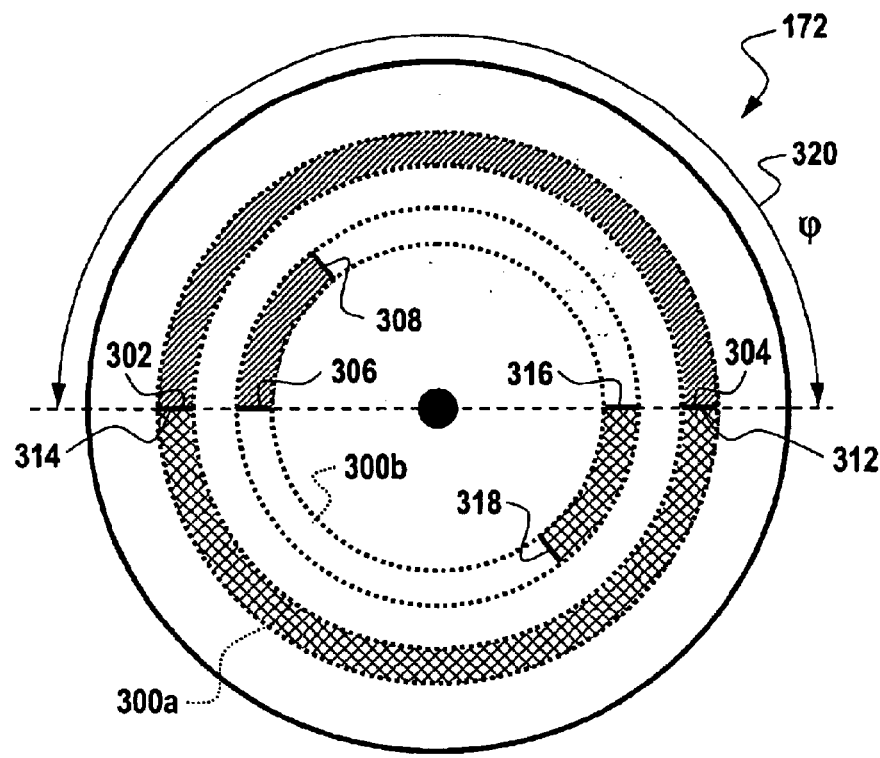
FIG. 7 is a diagram illustrating an example of storing information on a platter of a hard disk drive.

The above operation may be seen by way of a first example shown in FIG. 7. FIG. 7 is a top side view of platter 172. Platter 172 includes tracks 300a and 300b on its top side. In this example, the first location comprises a shaded portion of track 300a and a shaded portion of track 300b, and the second location comprises a crisscrossed portion of track 300a and a crisscrossed portion of track 300b. The information is stored in the first location beginning at a sector 302 through a sector 304 on track 300a and continuing at a sector 306 through a sector 308 on track 300b. The information is also stored in the second location beginning at a sector 312 through a sector 314 on track 300a and continuing at a sector 316 and ending at a sector 318 on track 300b. The phase difference Φ between sector 302 and sector 312, as indicated by an arrow 320, is 180 degrees because n equals two in this example. In addition, the phase difference Φ between sector 306 and sector 316 is also 180 degrees.

Although the first and second locations are each located on multiple tracks on the same side of platter 172 in the example of FIG. 7, the first and second locations may each comprise single tracks or portions of single tracks in other embodiments.

Figure 6:
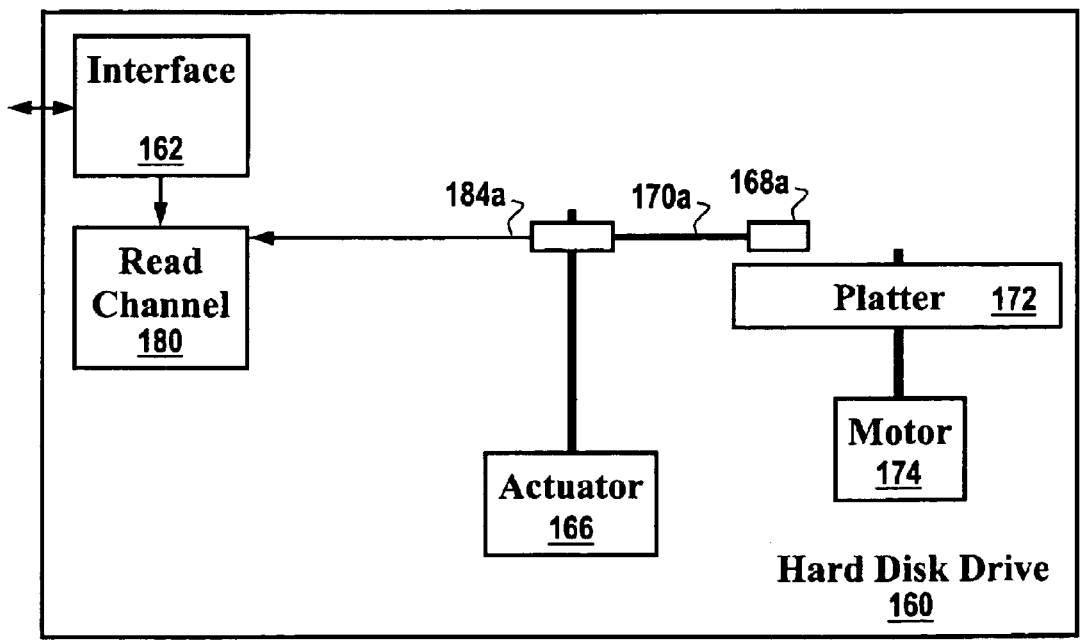
FIG. 6 is a diagram illustrating an embodiment of selected portions of a hard disk drive.

As shown in the embodiment of FIG. 6, the hard disk drive 160 further includes a read channel 180. Read channel 180 comprises a portion of the control logic of hard disk drive 160 and may be implemented using hardware, software, or a combination of hardware and software.

In response to a request from information handling system 100 to read the information, hard disk drive 160 accesses the information from either the first location or the second location on platter 172 using head 168a. In particular, hard disk drive 160 reads the information from the first location in response to a first amount of time required to access the information from the first location being less than a second amount of time required to access the information from the second location. Similarly, hard disk drive 160 reads the information from the second location in response to the first amount of time being greater than the second amount of time. To make this time determination, hard disk drive 160 may determine whether head 168a is closer to the beginning of the first location or to the beginning of the second location according to the movement of actuator 166 and motor 174.

In response to reading the information from either the first location or the second location, read channel 180 receives the information from head 168a and provides the information to interface 162 which provides the information to information handling system 100.

Figure 8:
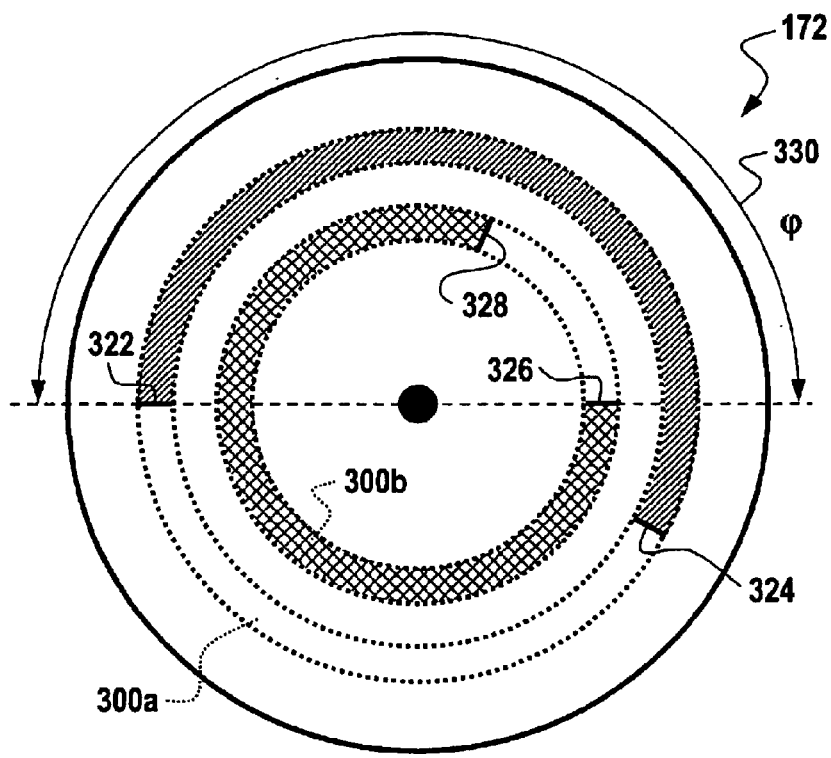
FIG. 8 is a diagram illustrating an example of storing information on a platter of a hard disk drive.

FIG. 8 illustrates a second example that uses the embodiment shown in FIGS. 5 and 6. FIG. 8 is a top side view of platter 172. Platter 172 includes tracks 300a and 300b on its top side. In this example, the first location comprises a shaded portion of track 300a, and the second location comprises a crisscrossed portion of track 300b. The information is stored in the first location beginning at a sector 322 and ending at a sector 324 on track 300a. The information is also stored in the second location beginning at a sector 326 and ending at a sector 328 on track 300b. The phase difference Φ between sector 322 and sector 326, as indicated by an arrow 330, is 180 degrees because n equals two in this example.

Although the first and second locations are each located on single tracks on the same side of platter 172 in the example of FIG. 8, the first and second locations may each comprise multiple tracks or portions of multiple tracks in other embodiments.

Figure 9A:
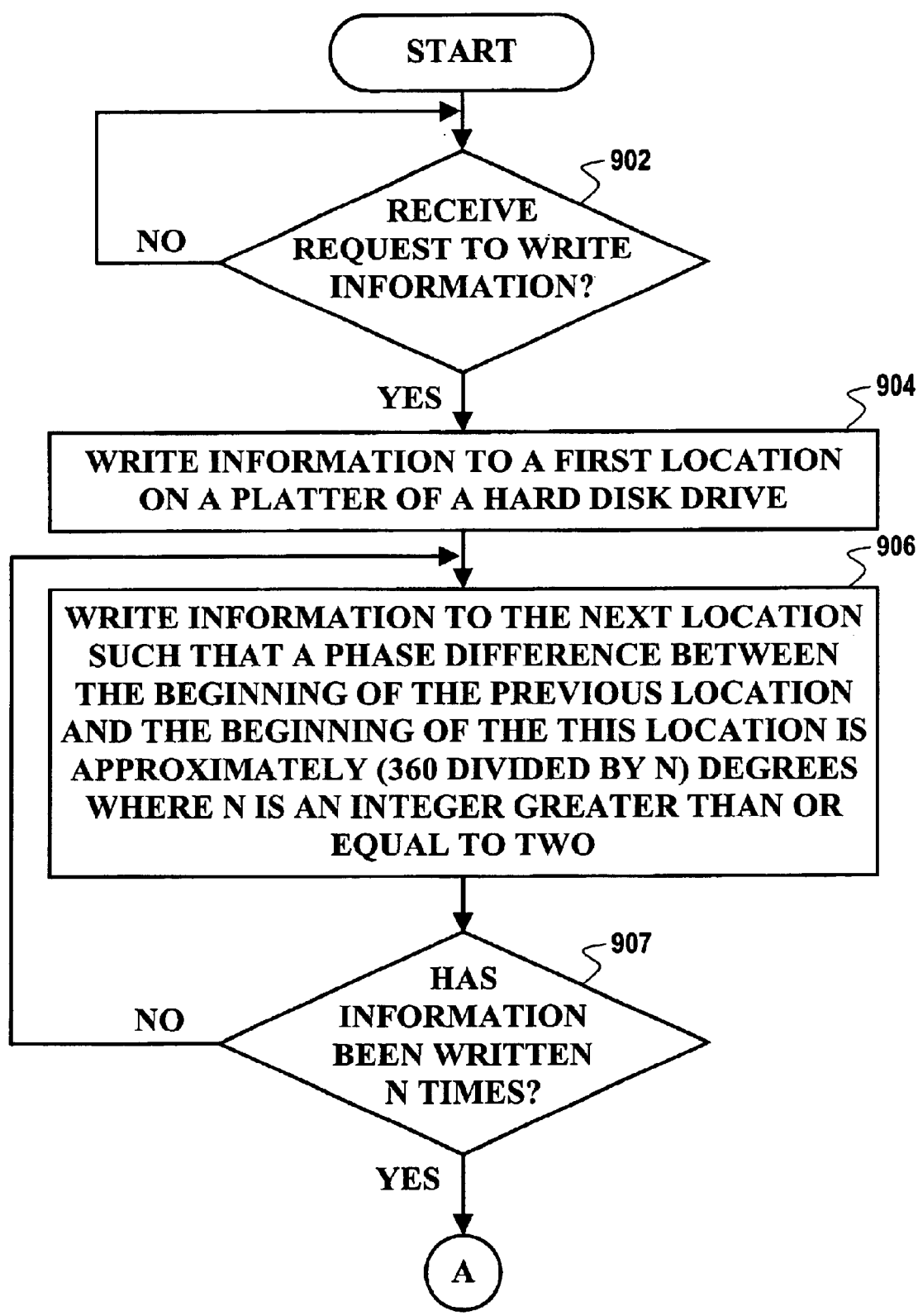
FIG. 9a is a first part of a flow chart illustrating an embodiment of a method for storing information on a hard disk drive.
Figure 9B:
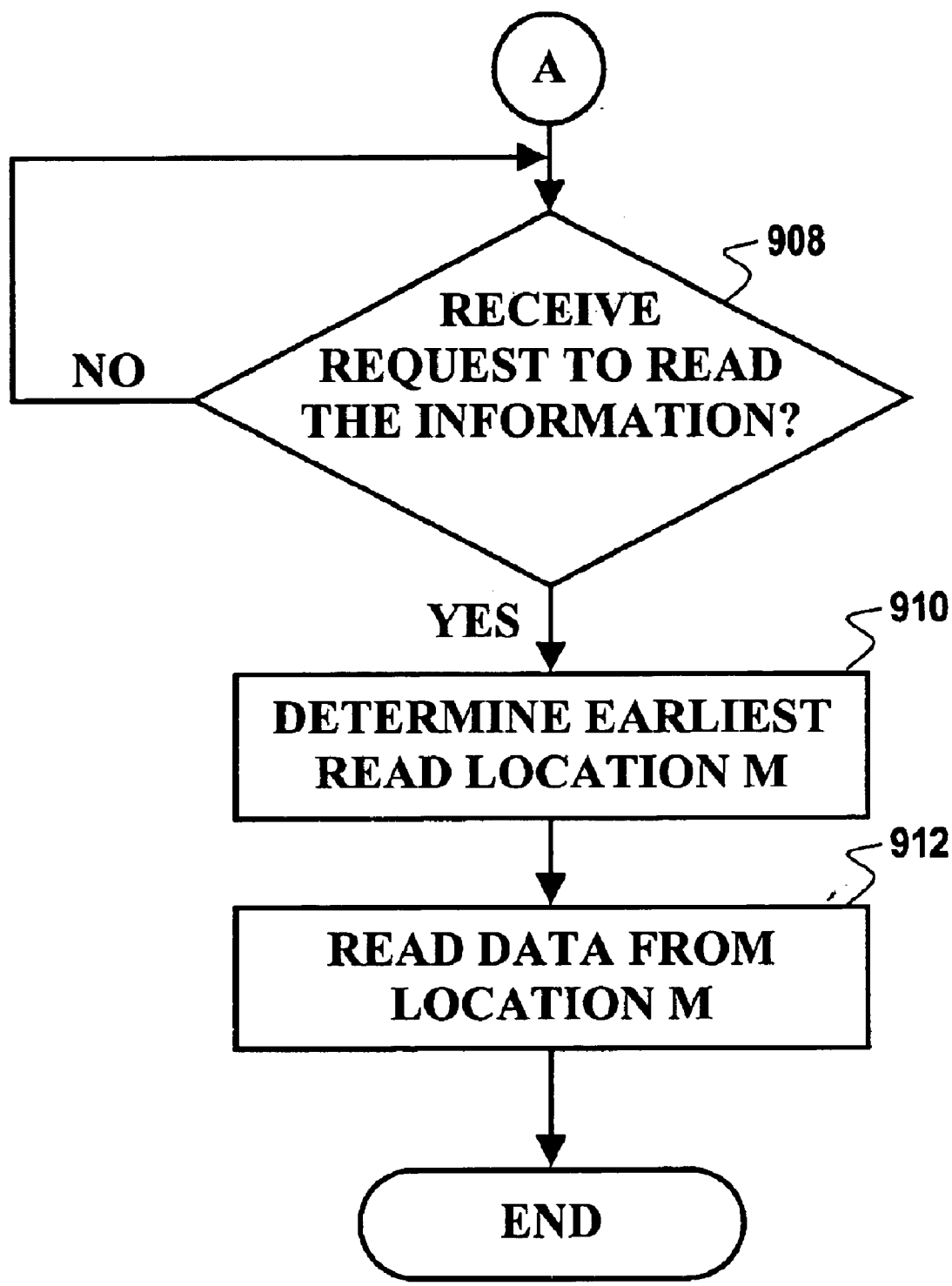
FIG. 9b is a second part of a flow chart illustrating an embodiment of a method for storing information on a hard disk drive.

FIGS. 9a and 9b are a flow chart illustrating an embodiment of the method described above. Referring to FIG. 9a, a determination is made as to whether a request to write information has been received as indicated in a step 902. If not, then the method returns to the state indicated by step 902. If so, then the information is written to a first location on a platter of a hard disk drive as indicated in a step 904. The information is written to n subsequent locations on the platter such that a phase difference between the beginning of any location and a beginning of the next location is (360 divided by n) degrees where n is an integer greater than or equal to two as indicated in a step 906 and a step 907.

Continuing at point A in FIG. 9b, a determination is made as to whether a request to read the information has been received as indicated in a step 908. If not, then the method returns to the state indicated by step 908. If so, a determination is made in a step 910 as to a location M where the information may be accessed earliest. The information is then read from location M, as indicated in a step 912.

In another embodiment, hard disk drive 160 includes multiple platters 172. In this embodiment, information may be stored in multiple locations on a single platter as described above. In addition, information may be stored in multiple locations on multiple platters. In particular, information may be stored on the different platters such that the phase difference between the copies is (360 divided by n) degrees, where n is an integer greater than or equal to two, between a beginning of the first location and a beginning of the second location.

In a further embodiment, hard disk drive 160 includes multiple platters 172 and data striping where information is divided up and each portion is stored at the same relative location on multiple platters. In this embodiment, the first location and the second location may each comprise multiple platters, i.e. data striping may be employed for each copy of the information stored on hard disk drive 160. Each corresponding portion of the information from the copies may be stored such that the phase difference between each portion is (360 divided by n) degrees, where n is an integer greater than or equal to two.

As can be seen, the principal advantages of these embodiments are that various shortcomings of previous techniques are overcome. For example, disk drive performance and/or data reliability may be increased without increasing the cost of an information handling system. In particular, the access time of a hard disk drive may be reduced because of reduced latencies achieved by strategically locating multiple copies of information on the drive. Further, multiple copies of information on the drive may enhance data reliability, particularly where the copies are on different sides of a platter or different platters altogether.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
   a processor; and
   a disk drive coupled to receive information from the processor, the disk drive including a platter;
   the disk drive configured to write the information to a first location on the platter, and the disk drive configured to write the information to n locations on the platter such that a phase difference between successive locations is approximately (360 divided by n) degrees, wherein n is any integer greater than 1;
   the disk drive including a write channel, an interface and a delay circuit, the write channel causing the information to be written to the first location and to a second location, the delay circuit buffering the information being written to the second location; and
   the disk drive including a read channel and a switch, the switch causing the information to be provided to the first and second locations whereby the read channel provides the information to the interface.

2. The information handling system of claim 1, wherein the platter includes a track, and wherein the track includes the n locations.

3. The information handling system of claim 1, wherein the platter includes n tracks, wherein the first track includes a first location, and wherein subsequent tracks include remaining locations.

4. The information handling system of claim 1, wherein the platter includes a first side and a second side, and wherein the first side includes the first location and the second side includes the second location.

5. The information handling system of claim 1, including multiple platters wherein the multiple platters include n sides and wherein each side may include at least one of the n locations.

6. The information handling system of claim 1, wherein, in response to receiving a request for the information from the processor, the disk drive is configured to read the information from any of the n locations.

7. The information handling system of claim 6, wherein, in response to receiving the request for the information from the processor, the disk drive is configured to read the information from the location which provides the least amount of time to access.

8. A method performed by an information handling system that includes a disk drive, the method comprising:
   writing information to a first location on a platter of the disk drive; and
   writing the information to n locations on the platter such that a phase difference between successive locations is approximately (360 divided by n) degrees, wherein n is any integer greater than 1;
   including in the disk drive, a write channel, an interface and a delay circuit, the write channel causing the information to be written to the first location and to a second location, the delay circuit buffering the information being written to the second location; and
   further including in the disk drive, a read channel and a switch, the switch causing the information to be provided to the first and second locations whereby the read channel provides the information to the interface.

9. The method of claim 8, wherein the platter includes a track, and wherein the track includes the n locations.

10. The method of claim 8, wherein the platter includes n tracks, wherein the first track includes the first location, and wherein subsequent tracks include the remaining locations.

11. The method of claim 8, wherein the platter includes a first side and a second side, and wherein the first side includes the first location and the second location.

12. The method of claim 8, including multiple platters wherein the multiple platters include n sides and wherein each side includes at least one of the n locations.

13. The method of claim 8, further comprising:
   in response to receiving a request for the information from the information handling system, reading the information from any of the n locations.

14. The method of claim 13, further comprising:
   in response to receiving the request for the information from the information handling system, reading the information from the location which responds in the least amount of time.

15. A disk drive comprising:
   a platter; and
   control logic;
   the control logic configured to cause information to be written to a first location on the platter, and the control logic configured to cause the information to be written to n locations on the platter such that a phase difference between successive locations is approximately (360 divided by n) degrees, wherein n is any integer greater than 1;
   the disk drive including a write channel, an interface and a delay circuit, the write channel causing the information to be written to the first location and to a second location, the delay circuit buffering the information being written to the second location; and
   the disk drive including a read channel and a switch, the switch causing the information to be provided to the first and second locations whereby the read channel provides the information to the interface.

16. The disk drive of claim 15, wherein the platter includes a track, and wherein the track includes the n locations.

17. The disk drive of claim 15, wherein the platter includes n tracks, wherein the first track includes the first location, and wherein subsequent tracks include remaining locations.

18. The disk drive of claim 15, wherein the platter includes a first side and a second side, and wherein the first side includes the first location and the second location.

19. The disk drive of claim 15, including multiple platters wherein the multiple platters include n sides and, wherein each side includes at least one of the n locations.

20. The disk drive of claim 15, wherein, in response to receiving a request for the information from an information handling system, the control logic is configured to cause the information to be read from any of the n locations.

21. The disk drive of claim 20, wherein, in response to receiving the request for the information from the information handling system, the control logic is configured to read the information from the location which provides the least amount of time to access.

* * * * *

UNITED STATES PATENT AND TRADEMARK OFFICE
CERTIFICATE OF CORRECTION

PATENT NO. : 6,917,490 B2
DATED : July 12, 2005
INVENTOR(S) : Pratt et al.

It is certified that error appears in the above-identified patent and that said Letters Patent is hereby corrected as shown below:

Column 7,
Line 38, delete "the first track" and insert -- a first track --.

Column 8,
Lines 10 and 50, delete "the first track" and insert -- a first track --.

Signed and Sealed this

Eighteenth Day of October, 2005

JON W. DUDAS
*Director of the United States Patent and Trademark Office*